United States Patent
Ortiz

(10) Patent No.: US 11,490,133 B1
(45) Date of Patent: Nov. 1, 2022

(54) INSERTION OF DIRECTED CONTENT INTO A VIDEO ASSET

(71) Applicant: Amazon Technologies, Inc., Seattle, WA (US)

(72) Inventor: Carlos Enrique Ortiz, Round Rock, TX (US)

(73) Assignee: Amazon Technologies, Inc., Seattle, WA (US)

(*) Notice: Subject to any disclaimer, the term of this patent is extended or adjusted under 35 U.S.C. 154(b) by 105 days.

(21) Appl. No.: 16/707,255

(22) Filed: Dec. 9, 2019

(51) Int. Cl.
*H04N 21/234* (2011.01)
*H04N 21/81* (2011.01)
*G06F 16/735* (2019.01)
*G06F 16/783* (2019.01)
*G06V 20/40* (2022.01)

(52) U.S. Cl.
CPC ..... *H04N 21/23424* (2013.01); *G06F 16/735* (2019.01); *G06F 16/7834* (2019.01); *G06F 16/7844* (2019.01); *G06V 20/46* (2022.01); *G06V 20/49* (2022.01); *H04N 21/812* (2013.01)

(58) Field of Classification Search
CPC ............ H04N 21/23424; H04N 21/812; G06F 16/7844; G06F 16/7834; G06F 16/735; G06K 9/00744; G06K 9/00765
USPC .......................................................... 725/32
See application file for complete search history.

(56) References Cited

U.S. PATENT DOCUMENTS

| | | | | |
|---|---|---|---|---|
| 2005/0193408 A1* | 9/2005 | Sull | ...................... | G11B 27/034 725/32 |
| 2007/0288950 A1* | 12/2007 | Downey | ............ | H04N 21/4828 725/9 |
| 2009/0094105 A1* | 4/2009 | Gounares | ............... | G06Q 30/02 705/14.69 |
| 2013/0272676 A1* | 10/2013 | Mo | .................... | H04N 21/4325 386/241 |
| 2015/0082349 A1* | 3/2015 | Ishtiaq | ............... | H04N 21/4884 725/40 |
| 2015/0245111 A1* | 8/2015 | Berry | ..................... | H04H 60/37 725/34 |

* cited by examiner

*Primary Examiner* — Alfonso Castro
(74) *Attorney, Agent, or Firm* — Eversheds Sutherland (US) LLP

(57) ABSTRACT

Technologies are provided for insertion of directed content into video assets based on analysis of audio data corresponding to the video assets. Some embodiments include a computing system that can receive audio data corresponding to a video asset. The computing system can generate, using the audio data, a time series of tags corresponding to speech conveyed by the video asset. The computing system can then generate a time-asset mapping between time and directed content using the time series and a correlation policy. The directed content can include digital media intended for a defined audience, for example. The time-asset mapping associates groups of directed content assets to respective specific times in the time series. The computing system can insert, using the mapping, a defined directed content asset from a group of directed content assets identified in the mapping.

12 Claims, 7 Drawing Sheets

INSERTION OF DIRECTED CONTENT INTO A VIDEO ASSET

BACKGROUND

Insertion of contextually meaningful advertisements into a video segment typically entails image analysis of frames that constitute the video segment. Such analysis commonly relies on machine-learning models. For typical video segments that span tens of seconds to several minutes, thousands to tens of thousands of frames may be analyzed. Such analysis is therefore computationally intensive. Large amounts of computing resources (compute time, data storage, communication bandwidth, etc.) can be consumed in order to identify attributes of the video segment that identify context of the content presented in the video segment. Therefore, improved technologies for insertion of content into digital video content may be desired. More specifically, several technical challenges remain to be addressed in the insertion of directed content into video segments.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
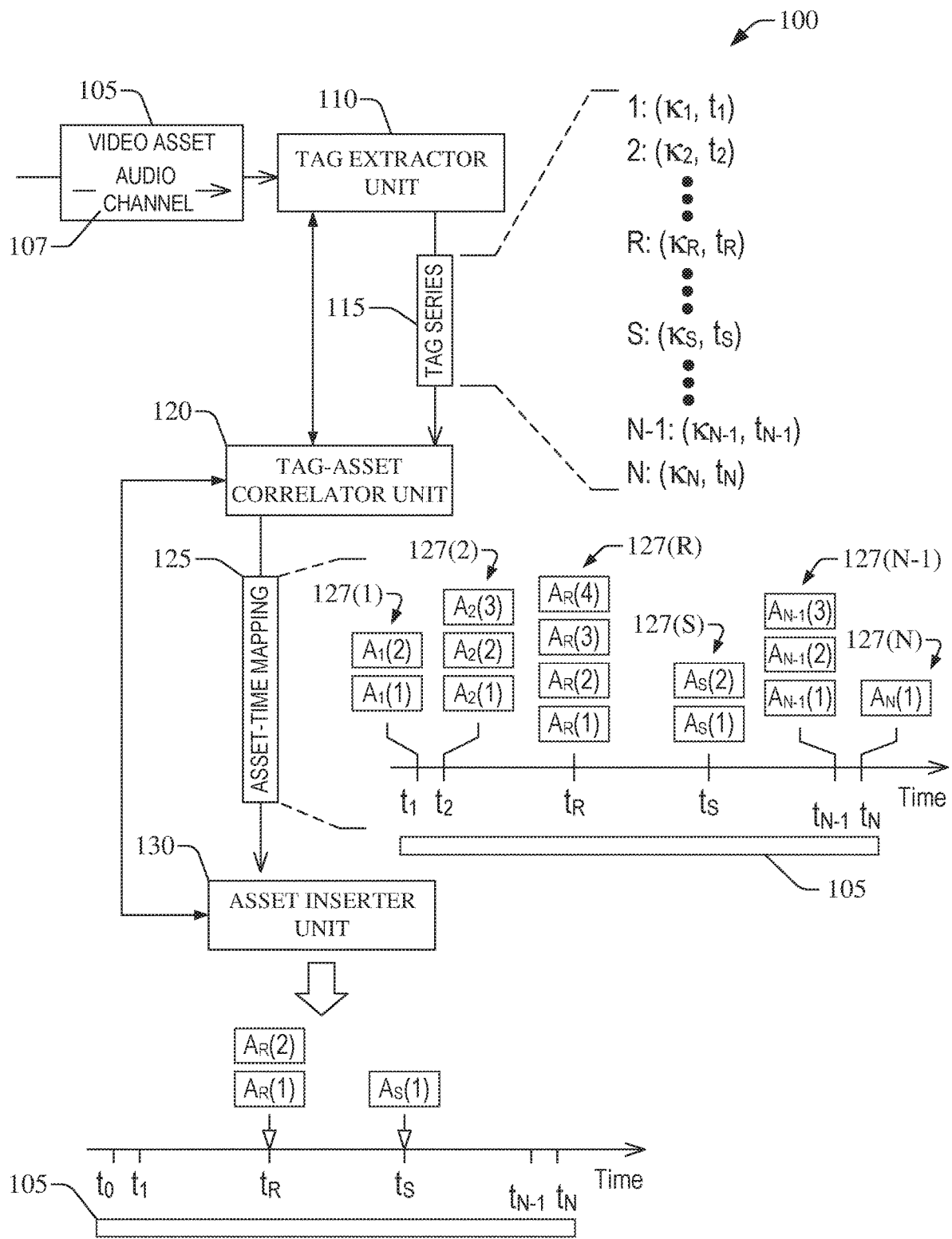
FIG. 1 illustrates an example of an operational environment for insertion of directed content into a video asset, in accordance with one or more embodiments of this disclosure.

The disclosure recognizes and addresses, amongst other technical challenges, the issue of insertion of directed content into a video asset. Embodiments of the disclosed technologies can be used for insertion of directed content into video assets by analyzing audio data corresponding to the video assets. In sharp contrast to conventional technologies, instead of analyzing large amounts of image data embedded in a video asset, the disclosed technologies apply speech recognition techniques to audio data embedded or otherwise synchronized with the video asset. As a result, the disclosed technologies can determine attributes of the video by identifying keywords or keyphrases present in the audio data. Those attributes characterize the video asset and can permit inserting contextually meaningful directed content into the video asset.

More particularly, embodiments of the disclosed technologies include a computing system that can receive audio data corresponding to a video asset. The computing system can generate, using the audio data, a time series of tags corresponding to speech conveyed by the video asset. The time series of tags is a temporal sequence of pairs, each pair including an utterance (a word or phrase, for example) and a time representing a moment at which the utterance occurred. That time is relative to the beginning of the video asset rather than being an absolute time during presentation of the video asset. The computing system can then generate a time-asset mapping between time and directed content using the time series and a correlation policy. The directed content can include digital media intended for a defined audience, for example. The time-asset mapping associates groups of directed content assets to respective specific times in the time series. The computing system can insert, using the mapping, a defined directed content asset from a group of directed content assets identified in the mapping.

Embodiments of the technologies disclosed herein improve performance of systems for the insertion of contextually meaningful digital content into video assets in numerous ways. For example, by analyzing audio data instead of image data within a video asset, the complexity and amount of data utilized to generate metadata representing attributes of the video asset are dramatically reduced due to the avoidance of analyzing thousands of video frames. As a result, the amount of computational resources needed to generate such metadata decreases dramatically. Sizeable speed-up factors can be achieved relative to image-based approaches for generation of attributes of video assets.

While embodiments of the disclosed technologies are described in connection with video assets, the disclosed technologies are not limited in that respect. Indeed, the principles and practical elements of the disclosed technologies can be applied to insertion of directed content into audio assets. In some instances, the disclosed technologies can be used to insert directed audio content into digital radio assets or streaming audio assets.

With reference to the drawings, FIG. 1 is a schematic block diagram of an example of an operational environment 100 for insertion of directed content into a video asset 105, in accordance with one or more embodiments of this disclosure. The operational environment 100 includes a tag extractor unit 110 that can acquire a video asset 105. In some instances, the video asset 105 can be a stream of video content spanning a defined time interval. Simply as an illustration, the stream of video content sent to an endpoint device via a network (neither the device nor the network is shown in FIG. 1). The stream of video content can be a live stream or a time-shifted stream. The video content corresponding to the video asset 105 can be generated from various sources, such as a video streaming service or a broadcasting network platform.

More specifically, the video content includes, for example, digital media, such as a feature motion picture, a feature animation, or another type of video segment. As such, the video content can include, for example, a hearing in Congress, a soccer match, a political campaign rally, or similar. The other digital video content can include, for example, an episode of a television show, a documentary, or similar. In other instances, the video asset 105 can be a video segment of a particular duration (5 minutes, 10 minutes, or 30 minutes, for example). The video segment can embody, for example, a gardening tutorial, an academic tutorial, a sports tutorial (such as a marathon training tutorial or an Olympic weightlifting tutorial), or similar.

The directed content that can be inserted into the video asset 105 refers, for example, to digital media configured for a particular audience and/or a particular outlet channel, such as a website, a streaming service, or a mobile application. Directed content can include, for example, any type of digital media, such as advertisement; motion pictures, animations, or other types of video segments; video games; podcasts; audio segments of defined durations (ringtones, songs, etc.); and the like.

The video asset 105 can be formatted according to one or numerous multimedia formats, such as WAV, MP3, MP4, FLAC, or similar. Regardless of its particular format, the video asset 105 can include a video channel (not depicted in FIG. 1) and an audio channel 107. One or several other audio channels also can be embedded in the video asset 105. In some configurations, the audio channel 107 can contain an original natural language of production of the video asset 105, and the other audio channel(s) can contain respective second natural languages. For instance, the other audio channel(s) can contain a dubbed version of the original natural language.

The tag extractor unit 110 can acquire the video channel and audio channel 107. The audio channel 107 carries audio data corresponding to the video asset 105. The audio data can be synchronized with video content contained in the video asset 105, for example. The tag extractor unit 110 can generate, using the audio data, a tag series 115 that pertain to the video asset 105. That tag series 115 is a temporal series of tags, where each tag corresponds to a defined time during the time span Δt of the video asset 105. Rather than being an absolute time during presentation of the video asset 105, the defined time associated with a tag in the tag series 115 identifies a time interval elapsed from the beginning of the video asset 105. Each tag in the tag series 115 also can correspond to a word or a phrase of a spoken natural language.

More concretely, to generate the tag series 115, the tag extractor unit 110 can analyze the audio data in the audio channel 107 to detect words within the video asset 105. The analysis can include, for example, the application of a speech recognition technique to the audio data. In some configurations, the speech recognition technique can be based on a machine-learning model configured to detect words of a natural language. The model also can be configured to identify phrases of the natural language. The machine learning model can define a particular type of neural network, such as a convolutional neural network (CNN), an adversarial neural network, or the like. Simply as an illustration, the CNN can include a few hidden layers of neurons (e.g., one hidden layer of neurons, two hidden layers of neurons, or three hidden layers of neurons). When present, two hidden layers of the CNN can be partially connected or fully connected.

Each word that is detected may not provide context for the video asset 105. Words and phrases that provide context for the video content conveyed by the video asset 105 can be referred to as keywords and keyphrases, respectively. Thus, at least one of the detected words can correspond to respective keywords. In addition, or in the alternative, at least one of the detected words can correspond to respective keyphrases. As a result, a tag κ in the tag series 115 can be a keyword or a keyphrase.

As such, the tag extractor 110 can pare a group number of tags (e.g., words) detected within a particular time interval by identifying keywords and/or keyphrases. For example, during a scene within the video asset 105, the tag extractor unit 110 can detect the words "he died in his sleep" and "he had been afflicted by heart disease for years." While the words "died," sleep," afflicted," and the phrase "heart disease" provide a specific context, the other detected words ("he, "in," "his," "had," been," "by," "for," and "years") may not contribute to the context. Thus, the tag extractor unit 110 can remove from the tag series 115 those words that do not provide context. As another example, the tag extractor unit 110 can detect the words "he has played consistently in all qualifier games" and "Messi clearly is the next El Diego of soccer." The tag extractor unit 110 can retain the words "Messi" and "soccer," and the phrases "El Diego" and "qualifier games." Those retained words and phrases can be keywords and keyphrases, respectively, which can provide context for the video asset 105.

Figure 2:
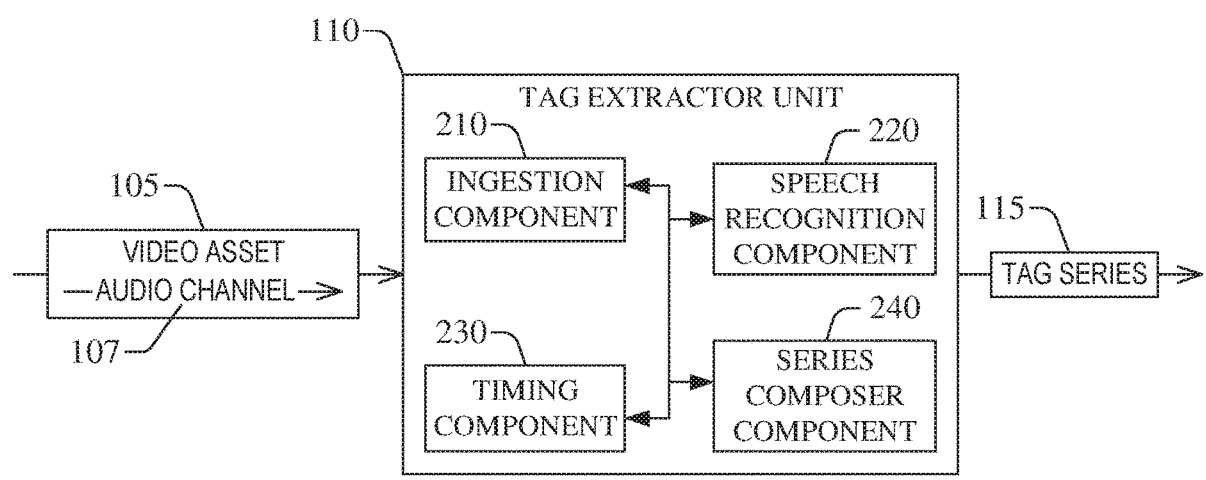
FIG. 2 illustrates an example of a unit for generation of a tag series using analysis of audio corresponding to a video asset, in accordance with one or more embodiments of this disclosure.

In some embodiments, as is illustrated in FIG. 2, a speech recognition component 220 can detect words or phrases, or both, using the audio data contained in the audio channel 107. The speech recognition component 220 can apply the machine-learning model or another type of speech recognition technique to the audio data in the audio channel 107. The speech recognition component 220 also can reduce a number of detected words and/or phrases by detecting defined keywords and defined keyphrases. To that end, the speech recognition 220 can apply a keyword spotting model in some embodiments. Examples of the keyword spotting model include a hidden Markov model and a Gaussian mixture model.

The tag extractor unit 110 also can generate a timestamp for each tag in the tag series 115. In this disclosure, a timestamp identifies a time interval elapsed from the beginning of a video asset or an audio asset. Thus, the timestamps generated by the tag extractor unit 110 correspond to respective time intervals elapsed from the beginning of the video asset 105. Such timestamps can be generated in response to detecting respective tags. As is illustrated in FIG. 2, the tag extractor unit 110 can include a timing component 230 that can generate such timestamps in some embodiments.

Accordingly, the tag series 115 can include multiple items, each item representing a tag-timestamp pair (κ, t). As is illustrated in FIG. 1, the tag series 115 can include N items: $\{(\kappa_1, t_1), (\kappa_2, t_2), \ldots, (\kappa_N, t_N)\}$. In some configurations, the time splits $\{\delta_i\}$ between consecutive timestamps $t_i$ and $t_{i+1}$ (with $1 \leq i < N$) can be determined by numerous factors, such as cadence of an interlocutor, type of scene occurring in the video asset 105, and the like. In some cases, the time splits are homogeneous; namely, the time interval between consecutive timestamps is the same. In other cases, the time splits $\{\delta_i\}$ are heterogeneous. In some embodiments, the tag extractor unit 110 can include a series composer component 240 (FIG. 2) that can associate a tag to a corresponding timestamp, and can create each pair in the tag series 115.

The tag extractor unit 110 can send the tag series 115 to a tag-asset correlator unit 120 that is included in the operational environment 100. Using the tag series 115, the tag-asset correlator can generate an asset-time mapping 125 between timestamps in the tag series 115 and directed content assets. The asset-time mapping 125 associates a first group of directed content assets to a first timestamp of the tag series 115. The mapping also associates a second group of directed content assets to a second timestamp of the tag series 115. The directed content assets in each one of those groups can include, for example, advertisements, animations, still images, audio segments, a combination thereof, or similar.

As is illustrated in FIG. 1, the asset-time mapping 125 can associate the timestamp $t_0$ to a group 127(1) of directed content assets including a first asset $A_1(1)$ and a second asset $A_1(2)$. The asset-time mapping 125 also can associate the timestamp $t_1$ to a group 127(2) of directed content assets including a first asset $A_2(1)$, a second asset $A_2(2)$, and a third asset $A_2(3)$. In addition, the asset-time mapping 125 can associate the timestamp $t_R$ to a group 127(R) of directed content assets including a first asset $A_R(1)$, a second asset $A_R(2)$, a third asset $A_R(3)$, and a fourth asset $A_R(4)$. Moreover, the asset-time mapping 125 can associate the timestamp $t_S$ to a group 127(S) of directed content assets including a first asset $A_S(1)$ and a second asset $A_S(2)$. Further, asset-time mapping 125 can associate the timestamp $t_{N-1}$ to a group 127(N-1) of directed content assets including a first asset $A_{N-1}(1)$, a second asset $A_{N-1}(2)$, and a third asset $A_{N-1}(3)$. The asset-time mapping 125 also can associate the timestamp $t_N$ to a group 127(N) of directed content assets including a first asset $A_N(1)$.

Figure 3:
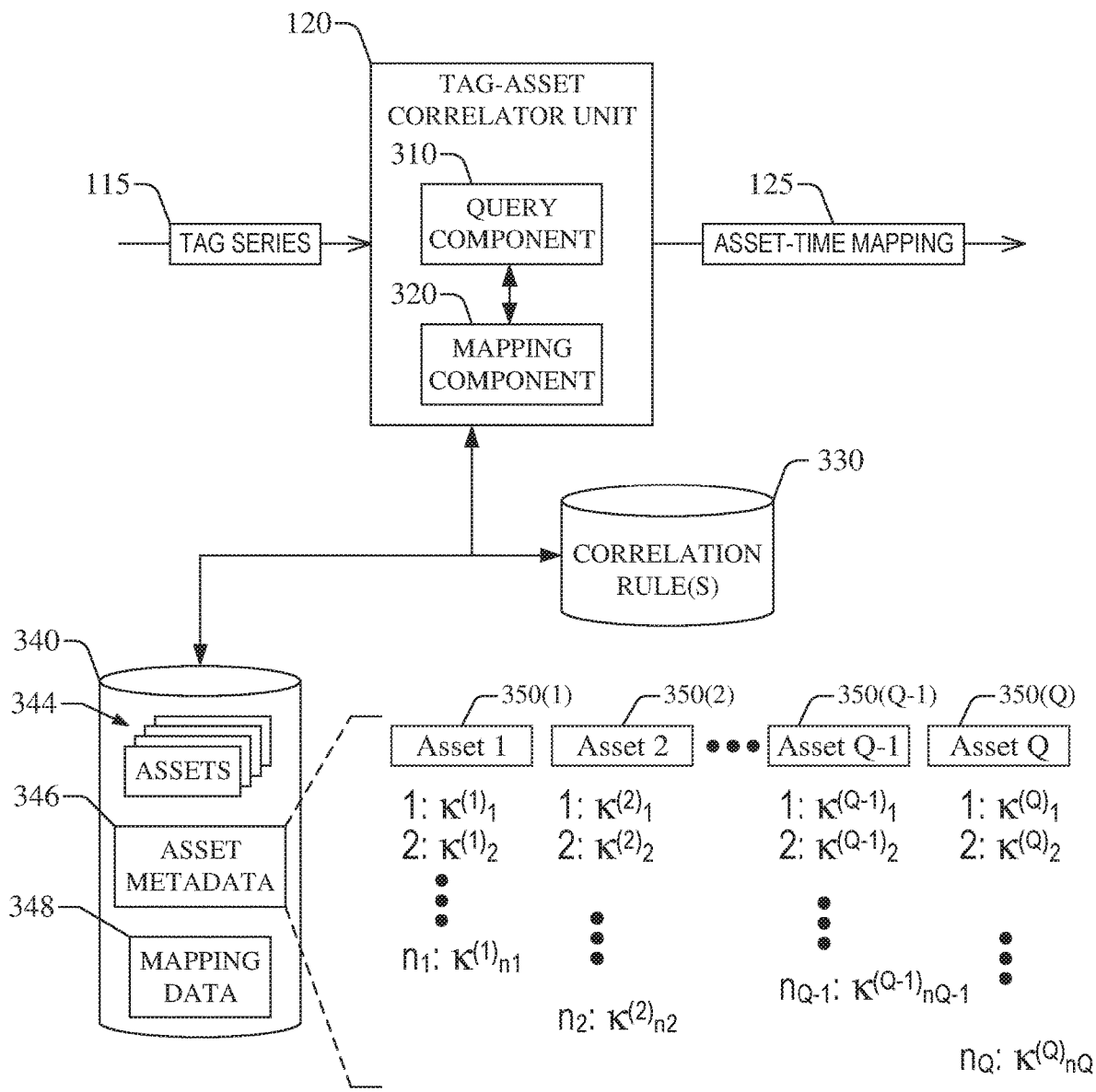
FIG. 3 illustrates an example of a unit for generation of a mapping between directed content assets and time, in accordance with one or more embodiments of this disclosure.

More concretely, to generate the asset-time mapping 125, the tag-asset correlator unit 120 can utilize a correlation policy and both the tags and timestamps in the tag series 115. Specifically, in some embodiments, as is shown in FIG. 3, the tag-asset correlator unit 120 can include a query component 310 that can acquire a tag in the tag series 115. The query component 310 can identify, using the tag, a group of directed content assets. To that end, the query component 310 can query a repository 340 that contains an inventory of assets 344 (referred to as assets 344). The repository 340 constitutes a storage area provided by one or many memory devices. The repository 340 also can include one or many management devices that permit accessing and/or updating data and metadata within the repository 340. In some embodiments, the repository 340 can embody a distributed database, for example, and can include one or multiple database management server devices (not depicted in FIG. 3).

The repository 340 also can include asset metadata 346 identifying directed content assets in the inventory of assets 344 and multiple tags for each of those assets. The number of the multiple tags available for an asset can vary from asset to asset. As is illustrated in FIG. 3, the directed content assets identified by the metadata 346 can include Q assets: an asset 350(1), an asset 350(2), and so forth up to an asset 350(Q-1) and an asset 350(Q). For each one of those assets, the asset metadata 346 can identify corresponding tags. Specifically, the asset metadata 346 can identify $n_1$ tags $\{\kappa^{(1)}_1, \kappa^{(1)}_2, \ldots \kappa^{(1)}_{n1}\}$ for the asset 350(1); $n_2$ tags $\{\kappa^{(2)}_1, \kappa^{(2)}_2, \ldots \kappa^{(2)}_{n2}\}$ for the asset 350(2); ...; $n_{Q-1}$ tags $\{\kappa^{(Q-1)}_1, \kappa^{(Q-1)}_2, \kappa^{(Q-1)}_{nQ-1}\}$; and $n_Q$ tags $\{\kappa^{(Q)}_1, \kappa^{(Q)}_2, \ldots \kappa^{(Q)}_{nQ}\}$ for the asset 350(Q). In some cases, for at least some assets, a number of tags nu can be different from another number of tags $n_v$, where the indices u, v=1, 2, . . . Q-1, Q, and the index u is different from the index v. In other cases, $n_u$ can be equal to $n_v$, for at least some assets.

In response a query corresponding to a tag in the tag series 115, the repository 340 can identify a group of directed content assets from the inventory 344. The repository 340 can send data identifying the group of directed content assets to the tag-asset correlator unit 120. A mapping component 320 included in the tag-asset correlator unit 120 can receive such data. The mapping component 320 can then select a defined directed content asset from the group of directed content assets by applying a correlation rule.

The correlation rule 330 is a part of the correlation policy utilized to generate the time-asset mapping 125. In one configuration, the correlation rule 330 can dictate that an asset that is identified first in response to the query is to be selected. In another configuration, the correlation rule can dictate that an asset that is identified last in response to the query is to be selected. In yet another configuration, the correlation rule can dictate that an asset having a particular cardinality (first, second, third, etc.) within search results responsive to the query is to be selected. In yet another configuration, the correlation rule can dictate that an asset having a satisfactory price point (e.g., highest price point, second highest price point) is to be selected. In still another configuration, the correlation rule can select multiple assets that, when playback in sequence, span a defined period. In one instance, the defined period can correspond to a time interval allotted for an advertisement break.

Accordingly, the correlation policy can result in a ranking of directed content assets for a particular timestamp in the tag series 115. The ranking can dictate priorities for insertion into the video asset 105 of respective assets of a group of directed content assets corresponding to a defined timestamp in the tag series 115. The higher ranked a directed content asset in the group, the higher the priority of insertion into the video asset 105. As is shown in FIG. 1, for example, for timestamp $t_R$, a ranking of four assets can be identified, and for timestamp $t_S$, a ranking of two directed content assets can be identified. The ranking of assets $A_R(1)$, $A_R(2)$, $A_R(3)$, and $A_R(4)$ can arrange those assets in descending order. Thus, the directed content asset $A_R(1)$ has the greatest priority of insertion into the video asset 105; the directed content asset $A_R(2)$ has the second greatest priority of insertion into the video asset 105; the directed content asset $A_R(3)$ has the third greatest priority of insertion into the video asset 105; and the directed content asset $A_R(4)$ has the fourth greatest priority of insertion into the video asset 105.

The mapping component 320 can assign the defined directed content asset to a defined timestamp. That defined timestamp corresponds to the tag in the query that resulted in the defined directed content asset. Accordingly, the defined directed content asset is mapped to the defined time. By identifying assets for each tag in the tag series 115 and mapping the assets to respective defined times, the tag-correlator unit 120 can generate the asset-time mapping 125. In some embodiments, the asset-time mapping 125 can be retained in one or more memory elements 348 (referred to as mapping data 348) within the repository 340.

Back to FIG. 1, the tag-asset correlator unit 120 can provide the asset-time mapping 125 to an asset inserter 130 included in the operational environment 100. Using at least the asset-time mapping 125, the asset inserter unit 130 can insert one or several defined directed content assets at respective times during the time span of the video asset 105. Prior to insertion of a defined directed content asset, the asset inserter unit 130 can select the defined directed content asset from a group of directed content assets corresponding to the defined time of insertion (e.g., time corresponding to timestamp $t_R$ or $t_S$). As mentioned, each asset in the group of directed content assets has a ranking within the group. The ranking of the asset represents priorities of insertion into the video asset 105. Further, a time of insertion is relative to the beginning of the video asset 105 rather than an absolute time during playback of the video asset 105. The beginning of the video asset 105 is depicted as to in FIG. 1.

Thus, the asset inserter unit 130 can identify an asset having a defined ranking within the group, and can identify such asset as the defined directed content asset. To that end, the asset inserter unit 130 can compare respective rankings within the group of directed content assets, and can identify an asset based on such a comparison. For example, a first asset in the group of directed content assets has a first ranking and, thus, a first priority of insertion into the video asset 105. A second asset in the group of directed content assets has a second ranking in the group and, thus, a second priority of insertion into the video asset 105. The asset inserter unit 130 can determine that the first priority is greater than the second priority, and can then identify the first asset as the defined directed content asset. For example, as is illustrated in FIG. 1, the asset inserter unit 130 can insert the assets $A_R(1)$ and $A_R(2)$ at time $t_R$, and the asset $A_S(1)$ at time $t_S$, as a result of comparing rankings of assets within respective groups of directed content assets corresponding to $t_R$ and $t_S$.

In addition, or in some embodiments, prior to inserting directed content into the video asset 105, the asset inserter unit 130 can apply one or many insertion rules to a defined directed content asset prior to modifying the video asset 105 by injecting the defined directed content asset at a particular time. An example insertion rule can dictate a particular frequency of presentation of directed content for a same video asset. Another example insertion rule can dictate that inserted directed content assets have durations not exceeding a threshold time interval. Accordingly, for the particular time, the asset inserter unit 130 can apply the insertion rule to a group of directed content assets corresponding to the particular time. The asset inserter unit 130 can then select one or more defined directed content assets satisfying the insertion rule.

Figure 4:
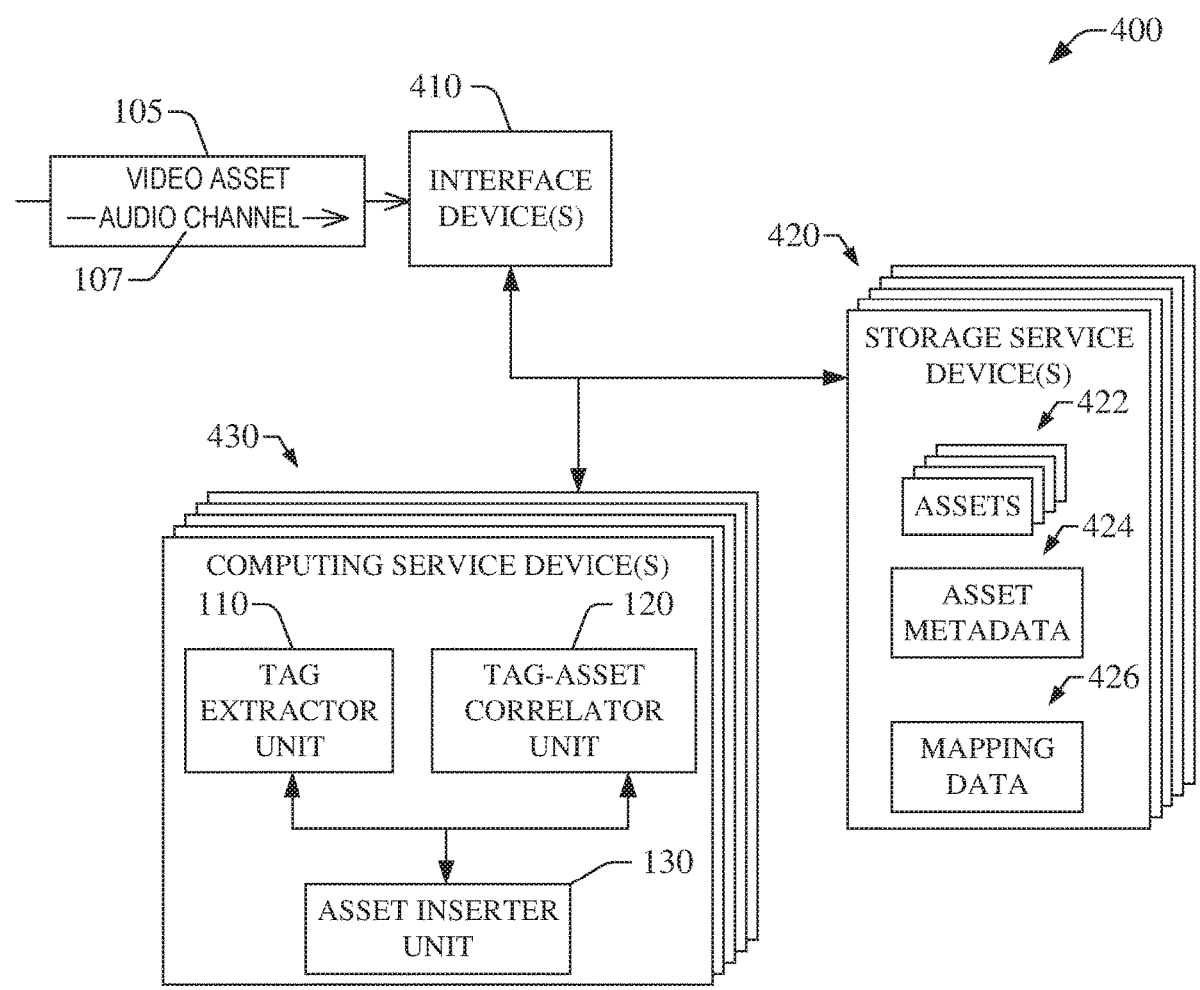
FIG. 4 illustrates an example of a computing system for the insertion of directed content into video content, in accordance with one or more embodiments of this disclosure.

FIG. 4 is a schematic block diagram of an example of a computing system 400 for the insertion of directed content into a video asset, in accordance with one or more embodiments of this disclosure. The computing system 400 also can be utilized insertion of directed audio content into an audio segment, such as a digital radio asset or a streaming audio asset. The computing system 400 can generate a temporal series of tags corresponding to the video asset and a mapping between directed content assets and timestamps pertaining to the temporal series of tags. Such a series can be generated by analyzing audio included in an audio channel of the video asset. The computing system 400 also can select, using the mapping, a particular directed content asset and a particular time for insertion into the video asset. The computing system 400 can then insert the particular directed content asset at the particular time. Again, such a particular time is relative to the beginning of the video asset 105 rather than being an absolute time during presentation of the video asset 105.

The example computing system 400 includes one or many interface devices 410 that can receive the video asset 105 from a source of video content (not depicted in FIG. 4). The interface devices 410 can include one or many processors functionally coupled to one or many memory devices that can retain a data collection module or another type of content ingestion component (neither one depicted in FIG. 4, but depicted as ingestion component 210 in FIG. 2). In some configurations, the data collection module can include an application programming interface (API) and/or another type of program code that can permit receiving the video asset 105 via a function call, for example. At least one of such processor(s) can execute the data access module to receive the video asset 105. At least one of the interface devices 410 can send the audio data carried in the audio channel 107 to one or many computing service devices 430 included in the computing system 400.

As is illustrated in FIG. 4, in some embodiments, the computing service device(s) 430 can include the tag extractor unit 110 and the tag-asset correlator unit 120. The computing service device(s) 430 also can include the asset inserter unit 130. Each of these units can operate in accordance with functionality described herein in connection with the insertion of directed content into video assets.

At least one of the computing service device(s) 430 can be functionally coupled to one or many storage devices 420. The coupling can be direct or can be mediated by the interface device 410. The storage service device(s) 420 include data and metadata that permits implementing the functionality described herein in connection with insertion of directed content in video assets. At least one of the storage service device(s) 420 can embody, or can include, the repository 340. Thus, as is illustrated in FIG. 4, the computing service device(s) 430 can retain an inventory of directed content assets 422 (e.g., an inventory of advertisements) and asset metadata 424 that can characterize the assets 422. The assets 422 can embody, or can include, the assets 344. The asset metadata 424 can embody, or can include, the asset metadata 346.

The storage service device(s) 420 also can retain mapping data 426 defining asset-time mappings for respective video assets. For example, the mapping data 426 can include the asset-time mapping 125 corresponding to the video asset 105. Although not shown in FIG. 4, at least one of the storage service device(s) 420 also can retain various types of data defining asset insertion rules, such as frequency of presentation of a particular directed content asset, time thresholds for a sequence of directed content asserts to be inserted into a video asset, or similar.

Figure 5:
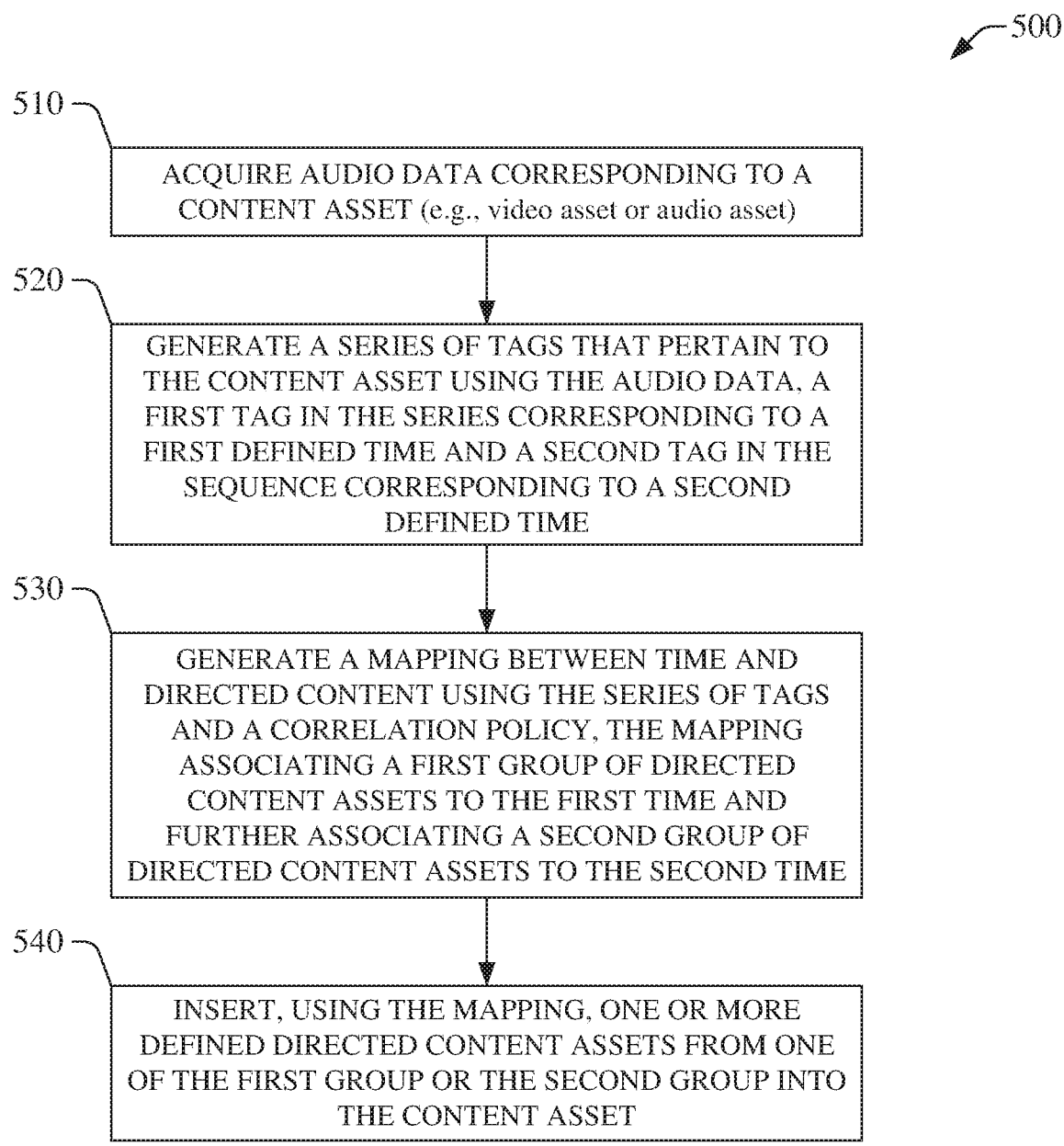
FIG. 5 illustrates an example of a method for inserting of directed content into a video segment, in accordance with one or more embodiments of this disclosure.
Figure 6:
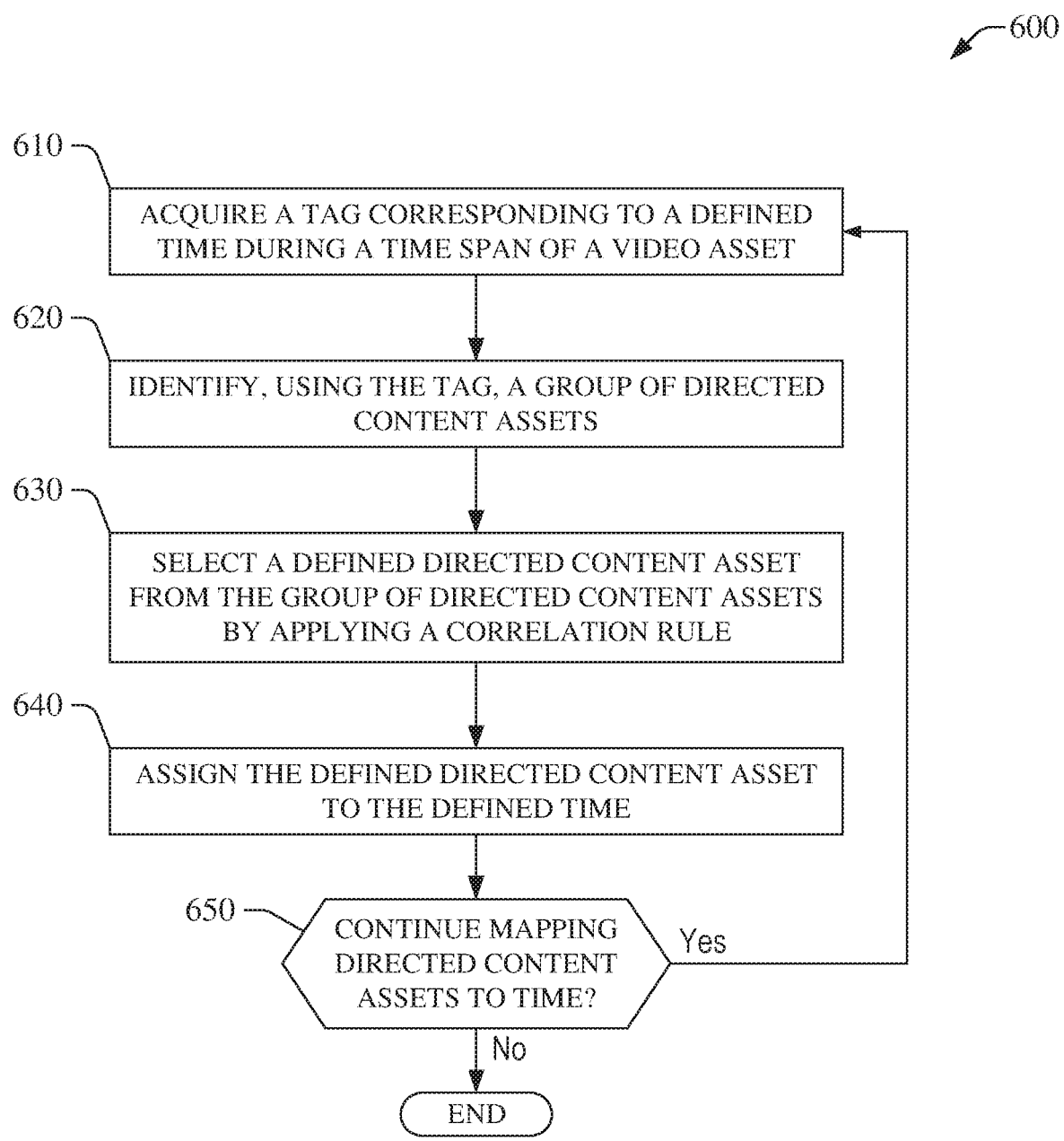
FIG. 6 illustrates an example of a method for generating a mapping between directed content assets and time, in accordance with one or more embodiments of this disclosure.

In view of the aspects of the techniques disclosed herein, an example method that can be implemented in accordance with the disclosure can be more readily appreciated with reference to the flowcharts in FIG. 5 and FIG. 6. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 5 is a flowchart of an example of a method 500 for inserting directed content into a content asset, according to one or more embodiments of the disclosure. The content asset contains digital content and, in some embodiments, can be a video asset or an audio asset. The digital content can include motion pictures, animations, still images, audio, a combination thereof, or similar. The example method can be implemented, entirely or partially, by a computing system having various computing resources. The computing system has at least one processor and/or is functionally coupled to at least one processor that can implement (e.g., compile, execute, compile and execute, etc.) one or more blocks of the example method 500. The computing system also can include one or many memory devices, other types of computing resources, or a combination thereof. Such processor(s), memory device(s), and computing resource(s), individually or in a particular combination, can permit the computing system to implement the example method 500, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 500 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can be memory device(s) and/or other computing resources. Regardless of the example method 500 being implemented by a distributed or non-distributed computing system, the at least one processor can be functionally coupled to at least one memory device or other types of computer-readable non-transitory storage media.

At block 510, the computing system can acquire audio data corresponding to a content asset. In embodiments in which the content asset is a video asset, the audio data can be acquired from an audio channel embedded into the video asset, for example. In some configurations, the video asset can contain multiple audio channels, such as a first audio channel that contains an original natural language of production of the video asset, and a second audio channel that contains a second natural language. For instance, the second audio channel can contain a dubbed version of the original natural language. The audio data also can be acquired from an audio channel that is synchronized with video content included in the video asset rather than being embedded in the video segment. In embodiments in which the content asset is an audio asset, the audio data corresponds to the audio contained in the audio asset.

At block 520, the computing system can generate, using the audio data, a series of tags that pertain to the content asset (e.g., a video asset or an audio asset). The series of tags is a temporal series. Thus, a first tag in the series corresponds to a first defined time during a duration of the content asset, and a second tag in the series corresponds to a second defined time during such a duration. The first defined time and the second defined time identify respective time intervals elapsed from the beginning of the content asset. The beginning of the video asset 105 is depicted as to in FIG. 1. More concretely, the computing system can analyze the audio data to detect words within speech conveyed in the audio data. The analysis can include, for example, the application of a speech recognition technique to the audio data. Accordingly, at least one of the detected words can correspond to respective keywords. In addition, or in the alternative, at least one of the detected words can correspond to respective keyphrases. As a result, a tag in the series of tags can be a keyword or a keyphrase. In addition, the computing system can generate timestamps for respective words (e.g., keywords or keyphrases) that are detected. Therefore, each item in the series of tags can include, for example, a pair formed by a keyword and a timestamp.

At block 530, the computing system can generate a mapping between time and directed content. The mapping can be generated using the series of tags generated at block 520 and a correlation policy. The mapping associates a first group of directed content assets to the first defined time of the first tag in the series of tags. The mapping also associates a second group of directed content assets to the second defined time. Each one of the first and second groups of directed content assets can include, for example, advertisements, animations, still images, audio segments, a combination thereof, or similar.

At block 540, the computing system can insert, using the mapping, one or more defined directed content assets from one of the first group or the second group into the content asset (e.g., a video asset or an audio asset). In some embodiments, inserting the defined directed content asset, the computing system can select the defined directed content asset from a group of directed content assets corresponding to a defined time of insertion into the content asset. Again, the defined time of insertion is relative to the beginning of the content asset rather than being an absolute time during presentation of the content asset.

Each asset in the group of directed content assets can have a ranking within the group. The ranking of the asset represents priorities of insertion into the video asset. Thus, the computing system can identify an asset having a defined ranking within the group, and also can identify such asset as the defined directed content asset. More specifically, the computing system can compare respective rankings within the group of directed content assets, and can then identify an asset based on such a comparison. As an illustration, a first asset in the group of directed content assets has a first ranking and, thus, a first priority of insertion into the video asset. A second asset in the group of directed content assets has a second ranking in the group and, thus, a second priority of insertion into the video asset. The computing system can determine that the first priority is greater than the second priority, and can then identify the first asset as the defined directed content asset.

In addition, or in other embodiments, inserting the defined directed content asset can include applying one or many insertion rules (such as a frequency of presentation rule) prior to modifying the video asset by injecting the defined directed content asset.

FIG. 6 presents a flowchart of an example of a method 600 for generating a mapping between time and directed content assets, according to one or more embodiments of the disclosure. While the example method 500 is described with reference to a video asset, the example method also can be implemented with respect to an audio asset. The example method 600 can be implemented, entirely or partially, by a computing system having various computing resources. By implementing the example method 600, the computing system can implement block 630 in example method 600. Such a computing system has at least one processor and/or is functionally coupled to at least one processor that can implement (e.g., compile, execute, compile and execute, etc.) one or more blocks of the example method 600. The computing system also can include one or many memory devices, other types of computing resources, or a combination thereof. Such processor(s), memory device(s), and computing resource(s), individually or in a particular combination, can permit the computing system to implement the example method 600, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 600 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can memory device(s) and/or other computing resources. Regardless of the example method 600 being implemented by a distributed or non-distributed computing system, the at least one processor can be functionally coupled to at least one memory device or other types of computer-readable non-transitory storage media.

At block 610, the computing system can acquire a tag corresponding to a defined time during a time span of a video asset. As mentioned, the defined time identifies a time interval elapsed from the beginning of the video asset. See, e.g., FIG. 1, where to represents the beginning of the video asset 105. The video asset can be, for example, a video stream of a defined duration or a video segment of a defined duration. Simply as an illustration, the video stream can be digital video content sent to an endpoint device via a network. The digital video content can be sent live in or in a time-shifted fashion.

At block 620, the computing system can identify, using the tag, a group of directed content assets. At block 630, the computing system can select a defined directed content asset from the group of directed content assets by applying a correlation rule. At block 640, the computing system can assign the defined directed content asset to the defined time. Accordingly, the defined directed content asset is mapped to the defined time.

At block 650, the computing system can determine if the mapping of directed content assets to time is to be continued. A negative determination results in the example method 600 ending. A positive determination results in the flow of the example method 600 continuing to block 610.

Figure 7:
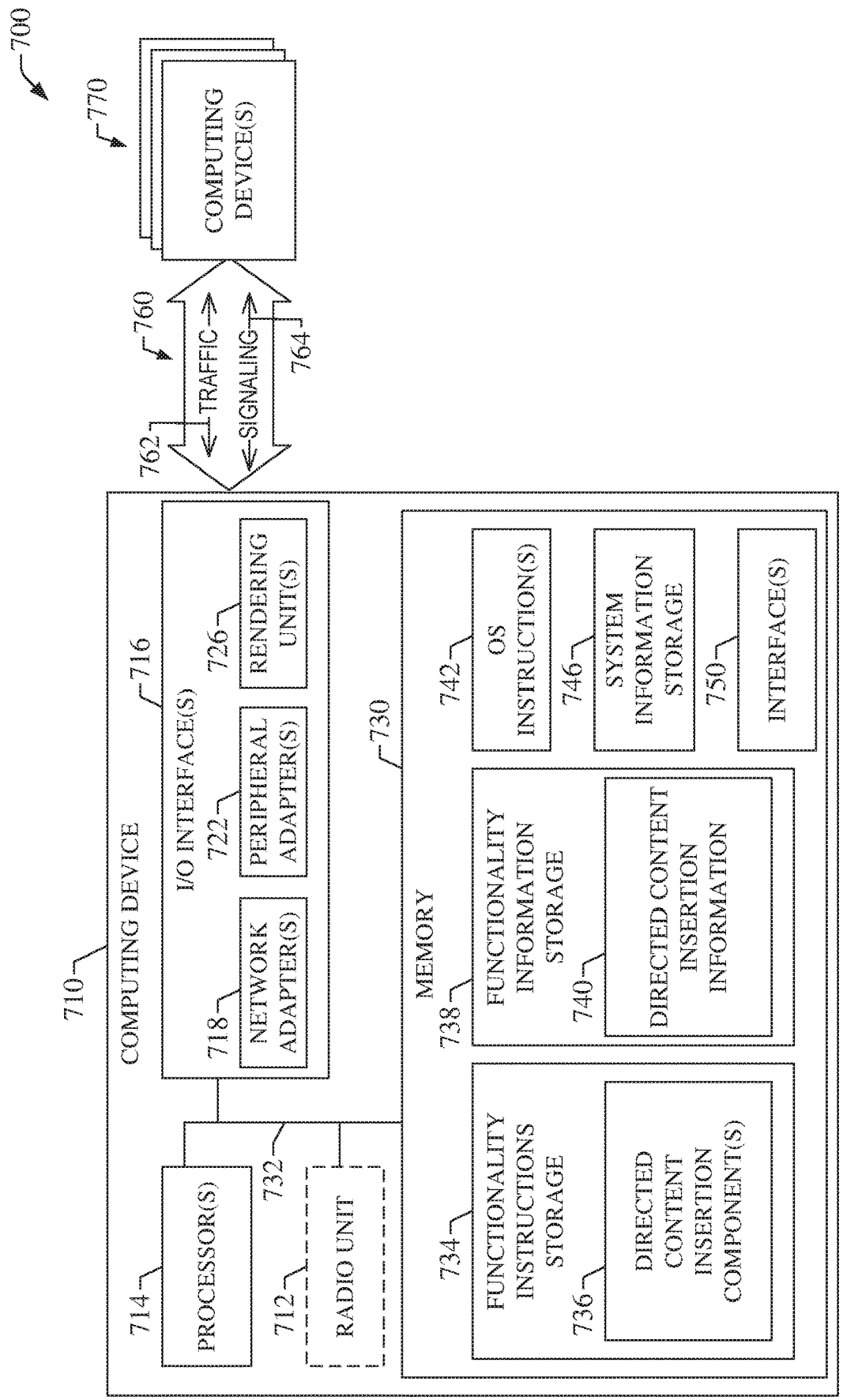
FIG. 7 illustrates an example of a computational environment for the insertion of directed content into a video asset, in accordance with one or more embodiments of the disclosure.

FIG. 7 illustrates a block diagram of an example computational environment 700 for insertion of directed content into a video asset, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 400.

The computational environment 700 represents an example implementation of the various aspects or features of the disclosure in which the processing or execution of operations described in connection with the insertion of directed content into a video asset disclosed herein can be performed in response to execution of one or more software components at the computing device 710. It should be appreciated that the one or more software components can render the computing device 710, or any other computing device that contains such components, a particular machine for insertion of directed content into a video asset as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example method presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the insertion of directed content into a video asset described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the directed content insertion component(s) 736 or the directed content insertion information 740, or both, can be distributed between the computing device 710 and at least one of the computing device(s) 770, and the computing device 710 and at least one of the computing device(s) 770 can execute such components and/or leverage such information.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as directed content insertion component(s) 736. In one scenario, execution of at least one component of the directed content insertion component(s) 736 can implement one or more of the methods described herein, such as the example method 500 or the example method 600, or both. For instance, such execution can cause a processor (e.g., one of the processor(s) 714) that executes the at least one component to carry out one or a combination of the disclosed example methods. It should be appreciated that, in one aspect, a processor of the processor(s) 714 that executes at least one of the directed content insertion component(s) 736 can retrieve information from or retain information in one or more memory elements 740 in the functionality information storage 738 in order to operate in accordance with the functionality programmed or otherwise configured by the directed content insertion component(s) 736. The one or more memory elements 740 may be referred to as directed content insertion information 740. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the directed content insertion component(s) 736 can embody, or can be part of, at least one of the tag extractor unit 110, the tag-asset correlator unit 120, or the asset inserter unit 130. As such, the one or more components can operate in accordance with, and can provide the functionality of, the tag extractor unit 110, the tag-asset correlator unit 120, or the asset inserter unit 130 in accordance with aspects described in this disclosure. In other embodiments, one or more of the directed content insertion component(s) 736 in combination with at least one of the processor(s) 714 can embody or can constitute at least one of the tag extractor unit 110, the tag-asset correlator unit 120, or the asset inserter unit 130, and can operate in accordance with, and can provide the functionality of, such units in accordance with aspects described in this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of directed content insertion component(s) 736 or directed content insertion information 740 can program or otherwise configure one or more of the processors 714 to operate at least in accordance with the functionality described herein. One or more of the processor(s) 714 can execute at least one of the directed content insertion component(s) 736 and leverage at least a portion of the information in the functionality information storage 738 in order to provide insertion of directed content into a video asset in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the directed content insertion component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DR-RAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for the insertion of directed content into a video asset. It is, of course, not possible to describe every conceivable combination of elements and/or methods for purposes of describing the various features of this disclosure, but it can be recognize that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
    receiving, by a computing system comprising at least one processor, audio data embedded in a defined audio channel within a video asset, the video asset formatted to include a video channel and multiple audio channels;
    detecting, by the computing system, multiple words represented by a portion of the audio data, a first word of the multiple words occurring at a first defined time within a duration of the video asset and a second word of the multiple words corresponding to a second defined time within the video asset;
    generating, by the computing system, a mapping between time and video content, the generating comprising, identifying multiple video segments corresponding to the first word by querying an inventory of video segments, a first video segment of the multiple video segments corresponding to a defined keyword, wherein the querying the inventory of video segments comprises performing a search of the inventory of video segments using the first word as a search query;
    identifying a group of video segments from the multiple video segments using a correlation rule, wherein the correlation rule dictates that a video segment in the group of video segments corresponds to a first result in the search; and
    assigning the group of video segments to the first defined time;
    determining a third defined time within the duration of the video asset, wherein the third defined time is associated with a second group of video segments;
    determining, based on an insertion rule, to omit insertion of the second group of video segments or a subset thereof at the third defined time;
    determining a fourth defined time within the duration of the video asset, wherein the fourth defined time is associated with a third group of video segments;
    determining, based on the insertion rule, to insert a defined video segment at the fourth defined time;
    selecting the defined video segment from the third group of video segments using the mapping; and
    inserting the defined video segment into the video asset at the fourth defined time.

2. The method of claim 1, wherein the video asset comprises a video segment having a defined duration or a stream of video content spanning the defined duration, and wherein the defined video segment comprises digital media intended for a defined audience.

3. The method of claim 1, wherein the detecting comprises applying a machine-learning model to the audio data, the machine-learning model being configured to identify an element of a natural language within the audio data, and wherein the machine-learning model defines a convolutional neural network.

4. A method, comprising:
    receiving, by a computing system comprising at least one processor, audio data corresponding to a video asset;
    generating, by the computing system, using the audio data, a time series of tags corresponding to speech conveyed by the video asset;
    generating, by the computing system, a mapping between time and directed content using the time series and a correlation policy, wherein the directed content comprises digital media intended for a defined audience, the mapping associating a first group of directed content assets to a first time in the time series and further associating a second group of directed content assets to a second time in the time series, wherein the generating the mapping comprises:
    accessing a first tag of the time series of tags;
    identifying, using the first tag, multiple directed content assets from an inventory of directed content assets;
    selecting, using the correlation policy, a second defined directed content asset from the multiple directed content assets; and
    assigning the second defined directed content asset to a defined time within the time series of tags;
    performing a search for the multiple directed content assets using the first tag to identify a group of directed content assets in the mapping, wherein the correlation policy comprises a rule that dictates that the second defined directed content asset has a defined cardinality within results of the search, the cardinality being at least one of first or last; and inserting, by the computing system, using the mapping, a defined directed content asset into the video asset, the defined directed content asset included in the group of directed content assets identified in the mapping, wherein the inserting of the defined directed content comprises applying one or more insertion rules that dictate the group of directed content assets should be omitted from a second defined time.

5. The method of claim 4, wherein the video asset comprises a video segment having a defined duration or a stream of video content spanning the defined duration.

6. The method of claim 4, wherein the defined directed content asset comprises one of a video segment having a first defined duration or an audio segment having a second defined duration.

7. The method of claim 4, wherein a first tag in the time series of tags comprises a word of a defined natural language, and wherein the generating the time series of tags comprises detecting multiple words of the natural language by applying a machine-learning model to the audio data.

8. The method of claim 7, wherein the generating the time series of tags further comprises, identifying at least one of a defined keyword or a defined keyphrase by applying a keyword model to the multiple words; and removing, from the multiple words, second words different from the identified defined keyword or the identified keyphrase.

9. The method of claim 4, wherein the correlation policy comprises a rule that dictates that the second defined directed content asset has a defined price point.

10. The method of claim 4, wherein a first asset in the group of directed content assets has a first priority of insertion into the video asset and a second asset in the group of directed content assets has a second priority of insertion into the video asset, the first priority being greater than the second priority, the method further comprising selecting the defined directed content asset from the group of directed content assets prior to the inserting by identifying the first asset as the defined directed content asset.

11. A computing system, comprising:
at least one processor; and
at least one memory device having computer-executable instructions stored thereon that, in response to execution by the at least one processor, cause the computing system to:
receive audio data corresponding to a video asset;
generate, using the audio data, a time series of tags corresponding to speech conveyed by the video asset;
generate a mapping between time and directed content using the time series and a correlation policy, wherein the directed content comprises digital media intended for a defined audience, the mapping associating a first group of directed content assets to a first time in the time series and further associating a second group of directed content assets to a second time in the time series, wherein generating the mapping comprises:
accessing a first tag of the time series of tags; and
identifying, using the first tag, multiple directed content assets from an inventory of directed content assets;
selecting, using the correlation policy, a second defined directed content asset from the multiple directed content assets; and
assigning the second defined directed content asset to a defined time within the time series of tags;
perform a search for the multiple directed content assets using the first tag to identify a group of directed content assets in the mapping, wherein the correlation policy comprises a rule that dictates that the second defined directed content asset has a defined cardinality within results of the search, the cardinality being at least one of first or last; and
insert, using the mapping, a defined directed content asset from a group of directed content assets identified in the mapping, wherein the inserting of the defined directed content comprises applying one or more insertion rules that dictate the group of directed content assets should be omitted from a second defined time.

12. The system of claim 11, wherein a first tag of the tags comprises a word of a defined natural language, and wherein the generating comprises detecting multiple words of the natural language by applying a machine-learning model to the audio data.

* * * * *